United States Patent
Dinerstein et al.

(10) Patent No.: US 10,242,318 B2
(45) Date of Patent: Mar. 26, 2019

(54) SYSTEM AND METHOD FOR HIERARCHICAL AND CHAINED INTERNET SECURITY ANALYSIS

(71) Applicant: Blue Coat Systems, Inc., Sunnyvale, CA (US)

(72) Inventors: Jonathan J. Dinerstein, Draper, UT (US); Daniel Hardman, American Fork, UT (US); Christian E. Larsen, Orem, UT (US)

(73) Assignee: SYMANTEC CORPORATION, Mountain View, CA (US)

( * ) Notice: Subject to any disclaimer, the term of this patent is extended or adjusted under 35 U.S.C. 154(b) by 246 days.

(21) Appl. No.: 15/254,748

(22) Filed: Sep. 1, 2016

(65) Prior Publication Data
US 2017/0346845 A1 Nov. 30, 2017

Related U.S. Application Data

(60) Provisional application No. 62/341,512, filed on May 25, 2016.

(51) Int. Cl.
*H04L 9/00* (2006.01)
*G06F 21/00* (2013.01)
*G06N 5/04* (2006.01)
*H04L 29/06* (2006.01)

(52) U.S. Cl.
CPC .......... *G06N 5/048* (2013.01); *H04L 63/105* (2013.01)

(58) Field of Classification Search
None
See application file for complete search history.

(56) References Cited

U.S. PATENT DOCUMENTS

| 9,596,266 | B1* | 3/2017 | Coleman | H04L 63/1491 |
| 2012/0102545 | A1* | 4/2012 | Carter, III | G06F 17/30864 726/3 |
| 2015/0334125 | A1* | 11/2015 | Bartos | H04L 63/1416 726/24 |

* cited by examiner

*Primary Examiner* — Alexander Lagor
(74) *Attorney, Agent, or Firm* — Maschoff Brennan (57) ABSTRACT

According to one embodiment, a method for predicting the trustworthiness of a particular website comprising receiving information about a plurality of websites and constructing a hierarchy of groups from the received information, the hierarchy of groups comprising one or more tiers and each tier comprising one or more groups. The method further comprising receiving information about a particular website and predicting the trustworthiness of the particular website based on the hierarchy.

18 Claims, 4 Drawing Sheets

SYSTEM AND METHOD FOR HIERARCHICAL AND CHAINED INTERNET SECURITY ANALYSIS

RELATED APPLICATIONS

This application claims the benefit of U.S. Provisional Application No. 62/341,512, filed May 25, 2016 and entitled "System and Method for Hierarchical and Chained Internet Security Analysis," which is hereby incorporated by reference in its entirety.

TECHNICAL FIELD

This disclosure relates in general to network-based points-of-entry. More particularly, this disclosure relates to a system and method for imputing reputation (vis-a-vis security) to such entities. This disclosure relies on security analysis that is both hierarchical and chained.

BACKGROUND

Malicious entities on a computer network may jeopardize the security, health, or privacy of a computer/user that participates in the ecosystem. Most commonly, malicious entities manifest as internet websites (or features/aspects thereof)—but malicious points of presence may also be other client computers, networked devices such as web cams or printers, peer-to-peer nodes such as those used in Tor or BitTorrent, anonymizers, applications installed on mobile phones and so forth. Malicious websites can be used to malware, viruses, spyware, spam, pharming and/or phishing activity. Some malicious websites may employ manipulative tactics or techniques to extract sensitive information about a user. Other malicious websites may gain access to a user's computer and collect sensitive information located on the computer. The collected information may then be used for various purposes, including to generate money.

SUMMARY OF THE DISCLOSURE

According to one embodiment, a method for predicting the trustworthiness of a particular website comprising receiving information about a plurality of websites and constructing a hierarchy of groups from the received information, the hierarchy of groups comprising one or more tiers and each tier comprising one or more groups. The method further comprising receiving information about a particular website and predicting the trustworthiness of the particular website based on the hierarchy.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Various types of software and hardware have been developed to protect computers and users against threats presented by malicious websites. In such conventional computer protection systems, a website is identified as malicious for the first time only after one or more users of a device report that the website exhibits signs of maliciousness. Because many internet users may visit a malicious website between the time the website is created and the time that computer protection systems are updated to detect the website as malicious, such an update may be futile. Accordingly, internet users may benefit from a computer protection system that can predict whether a website is malicious as websites are created.

The teachings of this disclosure recognize constructing and applying a hierarchical classifier using a hierarchical classifier tool to predict whether a website is trustworthy. The following describes systems and methods of predicting the trustworthiness of a website for providing these and other desired features.

For simplicity, this disclosure uses "website" in its most general sense, to cover any network point-of-presence that offers interaction to an accessing computer. Likewise, "internet" is used broadly, and should be understood to include smaller and less public networked environments as well (e.g., an intranet). For example, the teachings of this disclosure could be used to impute reputation to a directory within a website, to a Tor node, to crowdsourcing platforms (e.g., Amazon Mechanical Turk), to any device in the Internet of Things (e.g., webcams and internet-connected printers), or any other suitable network-based point-of-presence.

Figure 1:
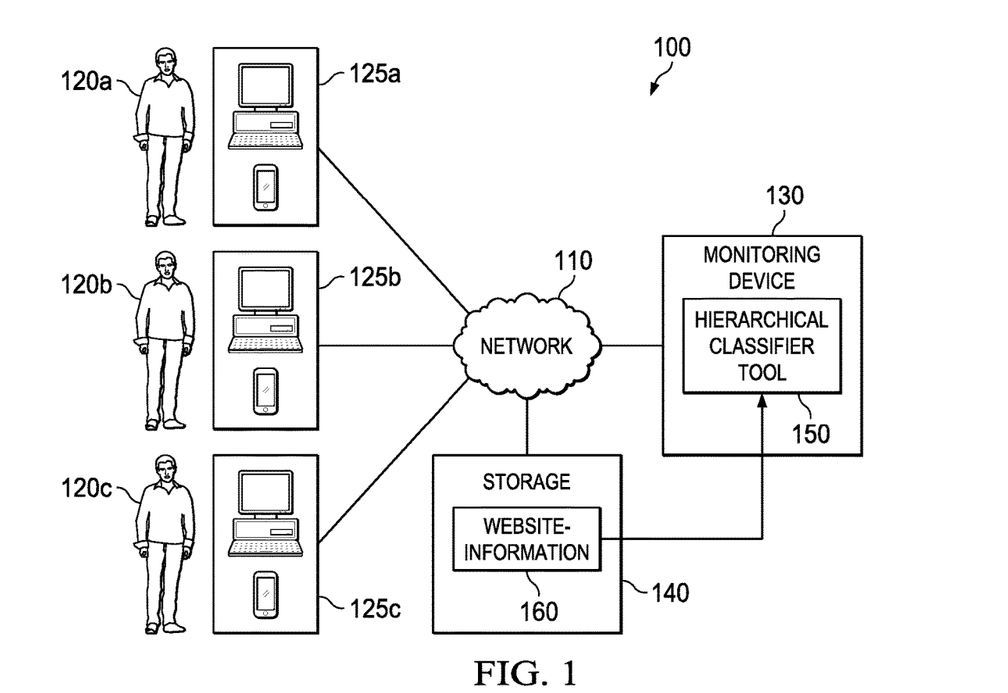
FIG. 1 is a block diagram illustrating an example of a network environment for a hierarchical classifier tool for predicting the trustworthiness of a website, according to certain embodiments.

FIG. 1 illustrates an example of a network environment for a hierarchical classifier tool for predicting the trustworthiness of a website. A network environment 100 may comprise a network 110, one or more users 120, one or more devices 125, a monitoring device 130, and a storage 140. In general, the teachings of this disclosure recognize using hierarchical classifier tool 150 to construct a hierarchical classifier based on received website information and to use the hierarchical classifier to predict the trustworthiness of a website. Hierarchical classifier tool 150 may be a program that can be executed by the processor of monitoring device 130. In some embodiments, monitoring device 130 can be a computer such as the computer 600 described below in reference to FIG. 6.

Network 110 may refer to any interconnecting system capable of transmitting audio, video, signals, data, messages, or any combination of the preceding. Network 110 may include all or a portion of a public switched telephone network, a public or private data network, a local area network (LAN), an ad hoc network, a personal area network (PAN), a metropolitan area network (MAN), a wide area network (WAN), a local, regional, or global communication or computer network such as the Internet, an enterprise intranet, or any other suitable communication link, including combinations thereof. One or more portions of one or more of these networks may be wired or wireless. Examples of wireless networks 110 may include a wireless PAN (WPAN) (e.g., a BLUETOOTH WPAN), a WI-FI network, a WI-MAX network, a cellular telephone network (e.g., a Global System for Mobile Communications (GSM) network), or other suitable wireless network or a combination of two or more of these.

Network environment 100 may include one or more users 120 in some embodiments. As depicted in FIG. 1, network environment 100 includes three users 120*a-c*. In some embodiments, a user 120 may access websites over network 110 using device 125. In doing so, user 120 may encounter websites that are not trustworthy (also referred to herein as malicious). In other embodiments, user 120 of network 110 is an internet monitor responsible for collecting information about the trustworthiness of websites. For example, a user 120 may collect information about the trustworthiness of websites and/or about possibly malicious websites (e.g., internet monitor may research whether a particular website is trustworthy using the internet, software, and/or suitable hardware). Although this disclosure has described specific types of users 120, this disclosure recognizes that user 120 may be any person or entity using a device 125 to access network 110.

Network environment 100 may also include one or more devices 125 in some embodiments. As depicted, network environment 100 includes three sets of devices 125, wherein each set of devices 125 is associated with a user 120. This disclosure contemplates device 125 being any appropriate device that can communicate over network 110. For example, device 125 may be a computer, a laptop, a wireless or cellular telephone, an electronic notebook, a personal digital assistant, a tablet, a server, a mainframe, or any other device capable of receiving, processing, storing, and/or communicating information with other components of network environment 100. Device 125 may also include a user interface, such as a display, a microphone, keypad, or other appropriate terminal equipment usable by a user. In some embodiments, an application executed by device 125 may perform the functions described herein.

Network environment 100 may include monitoring device 130 in some embodiments. Monitoring device 130 may be a computer, such as computer 600 of FIG. 6, in some embodiments. In some embodiments, monitoring device 130 may include hierarchical classifier tool 150. In some embodiments, hierarchical classifier tool 150 is software configured to be executed by monitoring device 130. As mentioned above, hierarchical classifier tool 150 may be configured to receive information about websites (also referred to herein as website information 160) and construct a hierarchical classifier based on the received information. In some embodiments, hierarchical classifier tool 150 may also be configured to determine the trustworthiness of a website based on the constructed hierarchical classifier.

Website information 160, from which the hierarchical classifier is constructed, may be stored on monitoring device 130 (e.g., website information 160 is stored on storage and/or memory of monitoring device 130) in some embodiments. In other embodiments, such as that depicted in FIG. 1, website information 160 is stored on an external storage (e.g., storage 140 of FIG. 1) and website information 160 is accessible by hierarchical classifier tool 150 over network 110.

Website information 160 may comprise information about a plurality of websites and the trustworthiness of each of the plurality of websites. For example, website information 160 may include a website identifier (e.g., name of website, uniform resource locator (URL), or any other suitable identifier) and one or more observations of whether each website is trustworthy. As used herein, an observation may be any information about a website, including any indications of the trustworthiness of a website.

Observations about websites may be received from users 120 and/or devices 125 in some embodiments. For example, a user 120 and/or device 125 may make observations about one or more websites. Such observations may be sent over network 110 and saved in storage 140 as website information 160. For example, user 120 may report that a virus was automatically downloaded to user's device 125 when user 120 visited Website X. As another example, device 125 may report that Website Y is potentially malicious when virus-protection software running on device 125 detects a possible threat. Such reports may be sent over network 110 and may be stored in storage 140 as website information 160. As yet another example, a user 120 (e.g., internet monitor) may report that the traffic associated with Website Z exhibits signs of maliciousness.

In addition to including reports from users 120 and devices 125, website information 160 may also include hierarchical information. As used herein, hierarchical information refers to information about associations of a website (e.g., associations of each website to a domain, an IP address, an autonomous system). For example, hierarchical classifier tool 150 may receive the following hierarchical information about Website A: Website A is associated with the ".info" domain; the ".info domain" is associated with the IP address 52.5.176.76; and the 52.5.176.76 IP address is associated with the autonomous system "Amazon-AES." In some embodiments, a constructed hierarchy (e.g., hierarchy 275 of FIG. 2) may include existing groups for the ".info" domain, the 52.5.176.76 IP address, and the autonomous system "Amazon-AES." In such embodiment, hierarchical classifier tool 150 may assign Website A to the existing groups. In other embodiments, the constructed hierarchy may not include groups for the ".info" domain, the 52.5.176.76 IP address, and/or the autonomous system "Amazon-AES." In such embodiment, hierarchical classifier tool 150 may create groups for the ".info" domain, the 52.5.176.76 IP address, and the autonomous system "Amazon-AES" and assign Website A to these groups once they are created.

Hierarchical information may be received from domain identifiers (e.g., WHOIS, Neustar Ultratools) in some embodiments. Website information 160 received from domain identifiers may also include an owner of a website, a geographical location where a website was created, and any other registration information about a website. In some embodiments, software running on device 125 or monitoring device 130 may be configured to provide a real-time determination about the trustworthiness of a website (e.g., Dynamic Real Time Rating® by Blue Coat Systems, Inc.). Although this disclosure describes specific types of website information 160 and specific sources of website information 160, this disclosure recognizes that website information 160 may comprise any suitable information and may be received from any suitable person, entity and/or device.

Figure 3:
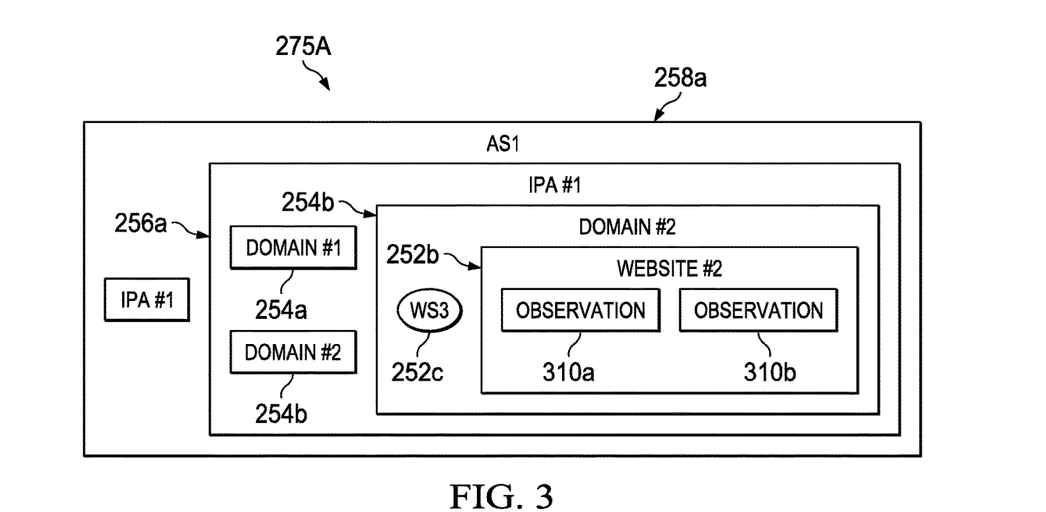
FIG. 3 is a block diagram illustrating the construction of a hierarchy using the hierarchical classifier tool of FIG. 2.
Figure 4:
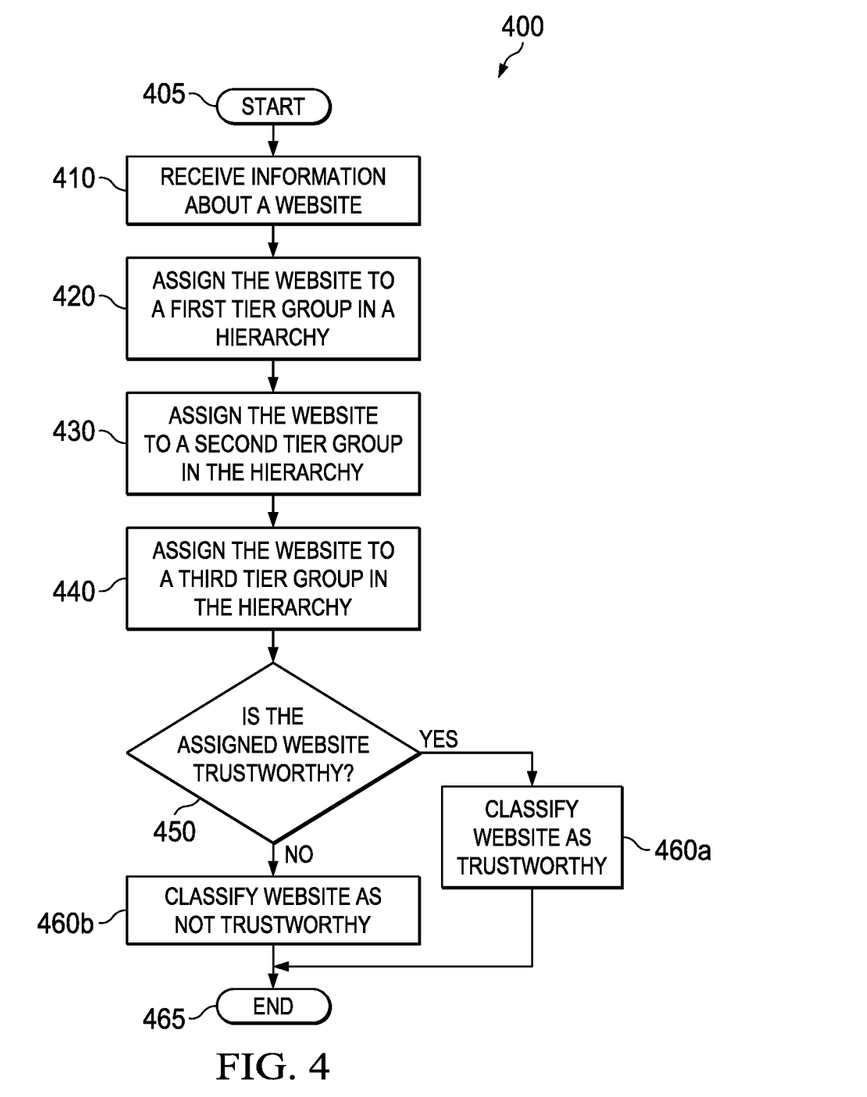
FIG. 4 is a flow chart illustrating a method of constructing a hierarchical classifier using the hierarchical classifier tool of FIG. 2, according to one embodiment.
Figure 5:
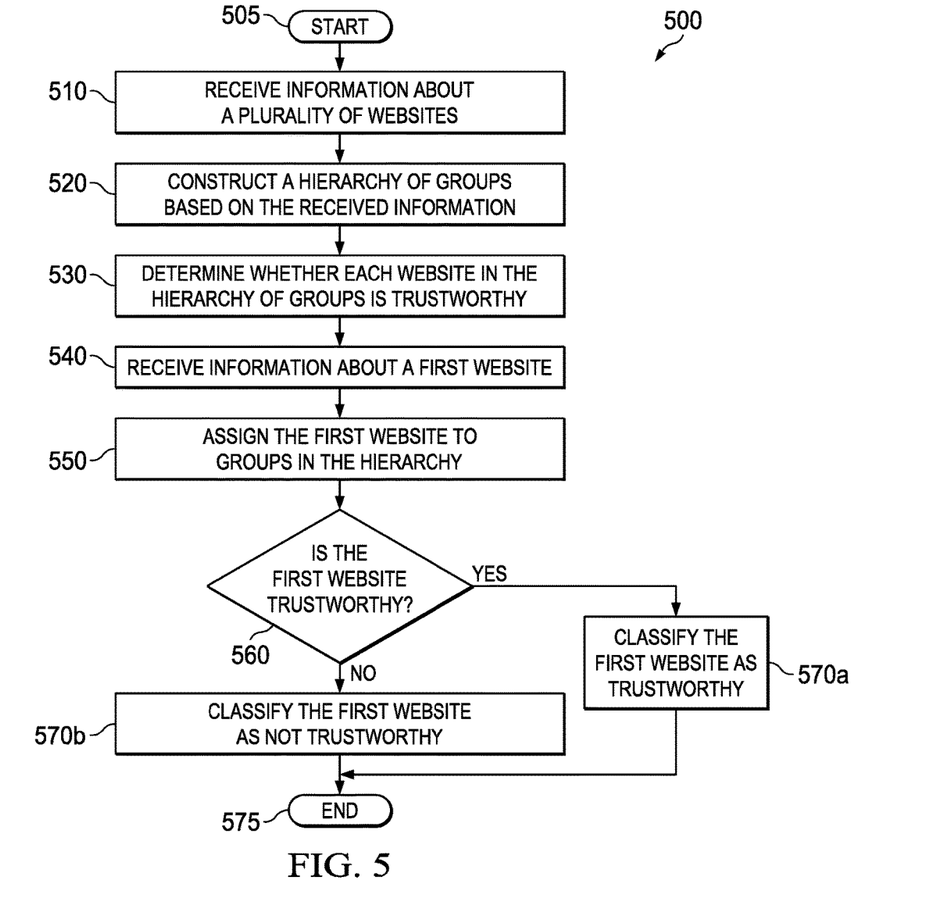
FIG. 5 is a flow chart illustrating a method of predicting the trustworthiness of a particular website using the hierarchical classifier constructed according to the method of FIG. 4, according to one embodiment.

Generally, hierarchical classifier tool 150 is configured to construct a hierarchical classifier and predict the trustworthiness of a website based on the constructed hierarchical classifier. In some embodiments, hierarchical classifier tool 150 may construct a hierarchical classifier and predict trustworthiness of websites as illustrated and described in reference to FIG. 2. FIG. 3 illustrates one embodiment of constructing the hierarchical classifier based on website information 160. FIG. 4 illustrates a method of constructing a hierarchical classifier and FIG. 5 illustrates a method of determining the trustworthiness of a website based on the hierarchical classifier. Finally, a computer system, such as monitoring device 130 configured to run hierarchical classifier tool 150, is illustrated and described in reference to FIG. 6.

Figure 2:
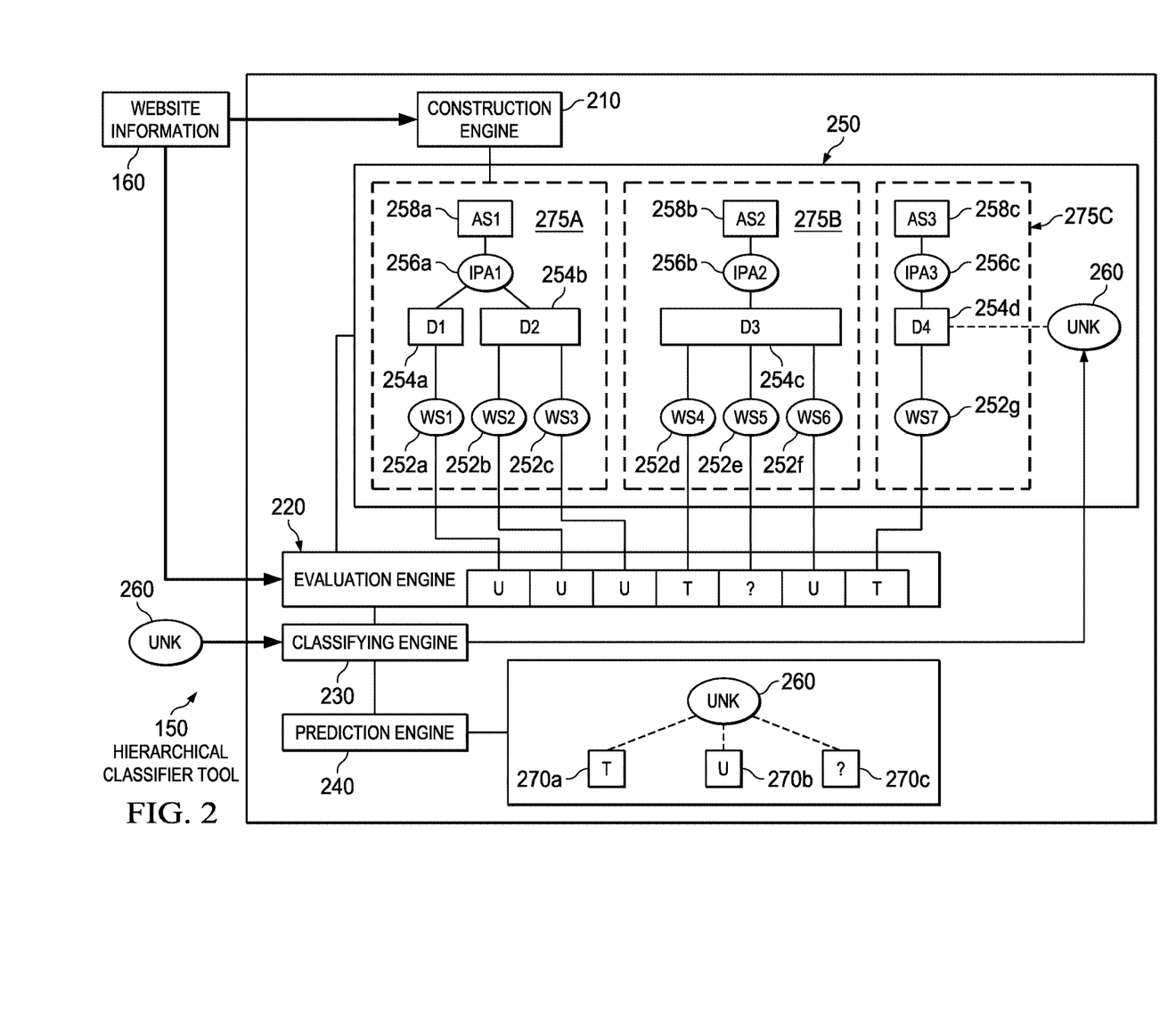
FIG. 2 is a block diagram illustrating the hierarchical classifier tool of FIG. 1, according to certain embodiments.

FIG. 2 illustrates hierarchical classifier tool 150 of FIG. 1. In some embodiments, hierarchical classifier tool 150 includes a construction engine 210, an evaluation engine 220, a classifying engine 230, and a prediction engine 240. Construction engine 210 may be configured to construct a hierarchical classifier 250, comprising one or more hierarchies 275, based on website information 160. Evaluation engine 220 may be configured to determine whether a website in the one or more hierarchies 275 is trustworthy based on website information 160. Classifying engine 230 may be configured to classify a particular website into the one or more hierarchies 275, and prediction engine 240 may be configured to determine whether the website is trustworthy. In some embodiments, engines 210, 220, 230, and 240 are executable software. In other embodiments, engines 210, 220, 230, and 240 are hardware. In yet other embodiments, engines 210, 220, 230, and 240 are a combination of software and hardware.

As mentioned above, construction engine 210 may be configured to construct a hierarchical classifier 250 comprising one or more hierarchies 275 based on website information 160. In some embodiments, construction engine 210 constructs hierarchies 275 based on hierarchical information received as website information 160. The construction of a hierarchy 275 will be further described below in reference to FIG. 3. As depicted in FIG. 2, construction engine 210 receives website information 160 regarding Websites #1-#7 252a-g, and constructs three separate hierarchies, indicated in FIG. 2 as hierarchy 275A, 275B, and 275C, from website information 160. As described earlier, website information 160 may be stored on an external storage 140 that is communicably coupled to hierarchical classifier tool 150.

Taking hierarchy 275A as an example, Website #1 252a is not associated with a domain 254 that is associated with any other website identified in website information 160 (websites 252b-252g). Rather, website 252a is the only website identified in website information 160 that is associated with Domain #1 254a. Although Website #1 252a is the only website 252 associated with Domain #1 254a, it is not the only website 252 associated with IP address #1 256a. Rather, Domains #1 and #2 254a, 254b are both associated with IP address #1 256a. Additionally, IP address #1 256a is associated with Autonomous System #1 258a. Thus, as understood from hierarchy 275A, Website #1, Website #2, and Website #3 252a-c share common hierarchical associations (e.g., websites 252a-c are all associated with the same IP address 256 and autonomous system 258). Similarly, as understood by hierarchy 275B, Websites #4, #5, and #6 252d-f are associated with the same domain (Domain #3 254c), the same IP address 256 (IP Address #2 256b), and the same autonomous system 258 (Autonomous System #2 258b). As is also understood from FIG. 2, Website #7 252g does not share any hierarchical associations with other websites 252a-252f included in received website information 160. Rather, Website #7 252g is associated with Domain #4 254d, IP Address #3 256c, and Autonomous System #3 258c. Although this disclosure describes a specific method of constructing one or more hierarchies 275, this disclosure recognizes constructing one or more hierarchies 275 using any suitable method.

Construction engine 210 may be configured to identify whether a group corresponding to a particular association of a website 252 exists within one or more hierarchies 275. If the group exists, construction engine 210 may be configured to assign a website 252 to the existing group. Alternatively, if the group does not exist, construction engine 210 may be configured to create a group that corresponds to the particular association. For example, Website Y may be associated with domain 254e (not depicted) that does not exist in hierarchy 275. Accordingly, construction engine 210 may create such group in hierarchy 275. Construction engine 210 may be configured to create one or more groups in one or more tiers in some embodiments. Construction engine 210 may also be configured to update one or more groups or one or more tiers in some embodiments (e.g., remove a website group 252 when a website no longer exists).

Hierarchy classifier tool 150 may include an evaluation engine 220 in some embodiments. Evaluation engine 220 may be configured to determine whether each website 252 in a constructed hierarchy 275 is trustworthy. In some embodiments, evaluation engine 220 determines the trustworthiness of each website (e.g., 252) assigned to one or more groups by construction engine 210. The determination may be based on information about that website 252 included in website information 160. As depicted in FIG. 2, evaluation engine 220 determines, based on website information 160, that: Website #1 252a is untrustworthy, Website #2 252b is untrustworthy, Website #3 252c is untrustworthy, Website #4 252d is trustworthy, Website #5 252e may or may not be trustworthy (also referred to herein as an "unknown" determination or an "inconclusive" determination or "indeterminable"), Website #6 252f is untrustworthy, and Website #7 252g is trustworthy. In some embodiments, evaluation engine 220 makes a determination about the trustworthiness of a website based on website information 160 regarding reports of maliciousness (e.g., reports from users 120 and devices 125), one or more website ratings databases, and/or any other suitable indication of trustworthiness. For example, in FIG. 2, website information 160 about Website #1 252a may include an indication that Website #1 252a downloaded a virus on user 120a's device 125a. In such case, evaluation engine 220 may determine that Website #1 252a is not trustworthy. As another example, website information 160 about Website #2 252b may include an observation that computer protection software on user 120b's device 125b detected a malware threat when user 120b attempted to access Website #2 252b. As yet another example, website information 160 about Website #3 252c may be associated with a report from user 120c noting that Website #3 252c is malicious. Alternatively, evaluation engine 220 may determine that Website #7 is trustworthy because Website #7 252g is not associated with website information 160 indicating that it is untrustworthy. For example, network traffic associated with Website #7 252g is not indicative of an untrustworthy website, there are no reports from users 120 that Website #7 252g is malicious, Website #7 252g is not associated with poor ratings from any website-ratings database, and WHOIS reports that Autonomous System #3 258C is owned by a trustworthy source.

In some embodiments, a determination of trustworthiness is based on website registration information included in website information 160. For example, evaluation engine 220 may determine that the trustworthiness of Website #5 252e is unknown because it was registered via a registrar known to register malicious websites in the past, but that registrar has not been registering malicious websites recently. As another example, evaluation engine 220 may determine that Website #6 252f is untrustworthy because it was created in a geographical location associated with high crime tendencies (e.g., Romania, China, Russia). Although this disclosure recognizes certain types of information that may be used to determine whether a website 252 is trustworthy, this disclosure recognizes that any suitable information may be used to determine whether a website is trustworthy.

Hierarchy classifier tool 150 may also include a classifying engine 230 in some embodiments. Classifying engine 230 may be configured to receive an identification of a website (e.g., name, URL) and identify groups of the one or more constructed hierarchies 275A-C to which the website belongs. In some embodiments, the identified website is a website that hierarchical classifier tool 150 has previously assigned to one or more groups of the one or more hierarchies 275. In other embodiments, the identified website is a website that hierarchical classifier tool 150 has not assigned to one or more groups of the one or more hierarchies 275.

As depicted in the FIG. 2, classifying engine 230 receives an identification of unknown website 260. Classifying engine 230 identifies, based on information about unknown website 260, one or more groups of the one or more hierarchies 275 to assign unknown website 260. Information about unknown website 160 may include information regarding hierarchical associations of unknown website 260 (e.g., information received from domain identifiers). For example, as depicted in FIG. 2, unknown website 260 is associated with a particular domain 254 (Domain #4 254d), a particular IP address 256 (IP Address #3 256c), and a particular autonomous system 258 (Autonomous System #3 258c). In some embodiments, classifying engine 230 assigns, or classifies, unknown website 260 into the one or more groups identified by classifying engine 230.

Hierarchical classifier tool 150 may also include prediction engine 240 in some embodiments. Prediction engine 240 may be configured to determine whether a website is trustworthy based on the constructed hierarchies 275. Stated differently, the trustworthiness of unknown website 160 may be predicted using hierarchical classifier 250. For example, as depicted in FIG. 2, prediction engine 240 predicts whether unknown website 260 is trustworthy 270a, untrustworthy 270b, or if unknown website is unable to be classified and the trustworthiness is unknown 270c. In some embodiments, prediction engine 240 may determine that trustworthiness of unknown website 260 is unclear based on information available about website 260, and tag it as indeterminable 270c. In some embodiments, predicting that the trustworthiness of website 260 is indeterminable or unknown 270c results in manual review of the trustworthiness of unknown website 260.

In some embodiments, such as those in which the received website is already classified in a constructed hierarchy 275, prediction engine 240 may rely on a prior determination of trustworthiness by evaluation engine 220. In other embodiments, such as those in which the received website is unknown (e.g., unknown website 260), prediction engine 240 may predict the trustworthiness of the website 260 based on the constructed hierarchies 275. For example, prediction engine 240 may predict whether unknown website 260 is trustworthy based on the information about websites assigned to the same hierarchy 275, or groups of such hierarchy 275, as unknown website 160. In some embodiments, prediction engine 240 uses determinations about the assignment or classification by classifying engine 230 to determine which websites share characteristics (e.g., trustworthiness) with unknown website 260.

Taking FIG. 2 as an example, if classifying engine 230 classifies unknown website 260 into groups of hierarchy 275A, prediction engine 240 may determine, based on website information 160 and/or a determination regarding the trustworthiness of websites included in hierarchy 275A (e.g., websites 252a-c, all determined to be untrustworthy 270b by evaluation engine 220) that unknown website 260 is also untrustworthy 270b. Alternatively, if classifying engine 230 determines that unknown website 260 should be assigned to groups in hierarchy 275C, prediction engine 240 may predict that unknown website 260 is trustworthy based on website information 160 and/or a determination regarding the trustworthiness of websites included in hierarchy 275C (e.g., Website #7 252g, determined to be trustworthy 270a by evaluation engine 220).

Prediction engine 240 may impute a trustworthiness determination on unknown website 260 in some embodiments. This may be the case when all websites 252 assigned to the same hierarchy 275 as unknown website 260 share a unanimous determination (e.g., all websites in a particular hierarchy, or assigned to the same groups of a particular hierarchy, are determined to be trustworthy 270a, untrustworthy 270b, or unknown 270c). In other embodiments, such as depicted in hierarchy 275B, imputing a single trustworthiness determination is more difficult because each website in hierarchy 275B has a different trustworthiness determination. In such cases, prediction engine 240 may rely completely on real-time data about unknown website 260 rather than on website information 160 about websites included in the same hierarchy as unknown website 260. As used herein, real-time data may refer to any information available about a website. For example, real-time data may include information provided by domain identifiers (e.g., WHOIS, Neustar Ultratools) and/or by ratings software (e.g., Dynamic Real Time Rating® by Blue Coat Systems, Inc.). Real-time data may also include information that is returned from one or more search engines (e.g., indications of trustworthiness of a website based on a Google® search of the particular website name). Although specific examples of real-time data have been described, this disclosure recognizes that real-time data may include any available information from any suitable source. In some other embodiments, prediction engine 240 may make its prediction based on more than one variable. For example, prediction engine 240 may make a prediction regarding the trustworthiness of a website 252 based on real-time data about unknown website 260, determinations of website trustworthiness by evaluation engine 220, and/or any other variable (e.g., impute trustworthiness of Website A because the creator of unknown website 160 is the same as the creator of Website A). Although this disclosure describes particular ways of predicting the trustworthiness of a website, hierarchical classifier tool 150 may predict the trustworthiness of a website based on any suitable variables.

Prediction engine 240 may also determine a confidence associated with its prediction in some embodiments. For example, prediction engine 240 may have a 99% confidence in its determination about unknown website 260 when it bases its determination on multiple sources of information. For example, prediction engine 240 may predict, at a 99% confidence, that unknown website 260 is untrustworthy when website information 160 regarding websites assigned to the same groups as unknown website 260 indicates that unknown website 260 is untrustworthy and when real-time data about unknown website 260 indicates that unknown website 260 is untrustworthy. In some embodiments, confidence in a prediction may correspond to whether the prediction is based on the received information about the plurality of websites (e.g., website information 160). For example, hierarchical classifier tool 150 may have a lower confidence in its prediction when the prediction is based solely on real-time data and have a higher confidence in the prediction when the prediction is based on website information 160. In some embodiments, if prediction engine 240 is only 40-60% confident in a determination (e.g., trustworthy 270a or untrustworthy 270b), prediction engine 240 will determine that trustworthiness is unknown or indeterminable 270c.

Hierarchical classifier tool 150 may use thresholds to determine whether a website is trustworthy. For example, evaluation engine 220 may use thresholds to determine whether each website of the plurality of websites identified in website information 160 is trustworthy. As another example, prediction engine 240 may use thresholds to determine whether a particular website (e.g., unknown website 160) is trustworthy. In some embodiments, hierarchical classifier tool 150 may use information from TABLE 1 below to determine whether a site is trustworthy:

TABLE 1

| Percentage of Trustworthiness-Related Information Indicative of a Trustworthy Website Determination | 0-35% | 36-65% | 70%-100% |
|---|---|---|---|
| | Not trustworthy | Unknown | Trustworthy |

As depicted by TABLE 1 above, if 70% or more of all information received about the trustworthiness of a particular website is indicative of a trustworthy website, hierarchical classifier tool 150 may make a determination that the website is trustworthy. If however, 0-35% of all information received about the trustworthiness of a particular website is indicative of a trustworthy website, hierarchical classifier tool 150 may determine that the website is not trustworthy. Hierarchical classifier tool 150 may determine that it is unable to make a determination regarding the trustworthiness of a website when 36-65% of the information received about the trustworthiness of the website is indicative of a trustworthy website.

This disclosure recognizes that hierarchical classifier tool 150 may continue to learn information about websites after an initial trustworthiness determination is made by evaluation engine 220 and/or prediction engine 240. For example, after prediction engine 240 predicts that unknown website 260 is untrustworthy 270b, hierarchical classifier tool 150 may receive website information 160 regarding the trustworthiness of unknown website 160 (e.g., reports of maliciousness, website ratings, etc.). As such, this disclosure recognizes that the engines of hierarchical classifier tool 150 may be updated so as to reflect the most current information received by hierarchical classifier tool 150.

Hierarchical classifier tool 150 may include other engines than those described and depicted in FIG. 2 in some embodiments. As one example, hierarchical classifier tool 150 may include a distribution engine (not depicted) configured to distribute (or "chain") information about unknown website 260 to other systems over network 110. The information distributed by distribution engine may include an identification of unknown website 260 and the determination about the trustworthiness of unknown website 260 by prediction engine 240. For example, distribution engine may distribute information about unknown website 260 to storage 140, and website information 160 may be updated to include the distributed information. This disclosure recognizes that other systems besides monitoring device 130 may utilize website information 160. For example, other website monitoring programs may benefit from using website information 160 or information distributed by distribution engine. As such, this disclosure recognizes chaining information used by, or determined, by hierarchical classifier tool 150 in other systems and/or software. This chained information may be sent and received over network 110.

FIG. 3 illustrates the construction of hierarchy 275A using hierarchical classifier tool 150. As mentioned above, construction of one or more hierarchies 275 by hierarchical classifier tool 150 may be based on website information 160. In some embodiments, construction engine 210 of hierarchical classifier tool 150 classifies (assigns) websites 252 into one or more hierarchies 275. In some embodiments, identifiers of websites 252 to be classified are received as website information 160. As depicted in FIG. 3, Website #2 252b is associated with Domain #2 254b, IP address number #1 256a, and Autonomous System #1 258a. As described above, each website 252 may be classified into one or more groups in one or more hierarchies 275 based on website information 160. FIG. 3 shows all groups within hierarchy 275A (e.g., Domain #1 254a, Domain #2 254b, IP Address #1 256a, and Autonomous System #1 258a) and website associations of Website #2. For example, FIG. 3 shows that Website #2 252b is in hierarchy 275A which also includes Website #1 252a and Website #3 252c. Because Website #2 252b is assigned to the same groups as Website #3 252c, Website #2 252b may have characteristics more similar to Website #3 252c than to Website #1 252a.

In constructing hierarchy 275A of FIG. 3, hierarchical classifier tool 150 may determine a domain 254 that Website #2 252b is associated with. Hierarchical classifier tool 150 may also determine an IP address 256 and an autonomous system 258 that Website #2 252b is associated with. This information about Website #2 252b may be included in website information 160. In some embodiments, this type of hierarchical information may be received from domain identifiers (e.g., WHOIS, Neustar Ultratools).

As mentioned above, information provided by domain identifiers may include registration information about a website. For example, WHOIS may provide information about Website #2 252b that reveals the owner of Website #2 252b, the geographical origin of Website #2 252b, the IP address 256 associated with Website #2 252b, and the autonomous system 258 associated with Website #2 252b. For example, hierarchical classifier tool 150 may receive information that Website #2 252b is associated with the ".info" top=level domain 254b, originated in Russia, and is associated with a website owner that has been indicated as untrustworthy. Using the hierarchical information, hierarchical classifier tool 150 may construct a hierarchy 275 by assigning Website #2 252b to at least one group in each tier of the hierarchy 275 (e.g., domain tier, IP address tier, and autonomous system tier).

As described above, construction engine 210 receives website information 160 and, based on the received website information 160, constructs one or more hierarchies 275 that comprise one or more groups. As depicted in FIG. 2, construction engine 210 constructs three hierarchies 275A, 275B and 275C, comprising a number of tiers and a number of groups. As depicted in FIG. 3, construction engine 210 constructs one hierarchy 275A comprising four groups (e.g., Domain #1 254a, Domain #2 254b, IP Address #1 256a, and Autonomous System #1 258a) and three tiers (domain tier, IP address tier, and autonomous system tier). Construction engine 210 may assign and/or classify each website identified in website information 160 to at least one group in each tier. In some embodiments, construction engine 210 assigns each website to a group based on hierarchical information about associations of each website.

As depicted in FIG. 3, website information 160 may also include one or more observations 310 about websites. For example, FIG. 3 shows that Website #2 252b is associated with two observations 310a, 310b. As an example, observation 310a may be a notification that the traffic associated with Website #2 252b appears suspicious. Observation 310b may be a report from user 120's computer security software that Website #2 252b appears malicious.

FIGS. 4 and 5 are directed to methods of using hierarchical classifier tool 150. A computer such as described with respect to FIG. 6 may be used to perform the methods of FIGS. 4 and 5. The methods of FIGS. 4 and 5 may represent algorithms that are stored on a computer readable medium such as a memory of a computer (e.g., the memory 620 of FIG. 6).

Turning now to FIG. 4, the method 400 illustrates one embodiment of constructing a hierarchical classifier using the hierarchical classifier tool of FIG. 2. The method 400 begins in step 405. At step 410, hierarchical classified tool 150 receives information about a website (e.g., website information 160). As described above, the received website information 160 may include information about one or more websites including the names of websites, URLs of websites, designations of trustworthiness of websites, observations about websites (e.g., observations 310 of FIG. 3), and hierarchical information regarding associations of websites (e.g., associations of a website as to a particular domain 254, IP address 256, and/or autonomous system 258). Although specific types of website information 160 have been described herein, this disclosure recognizes that website information 160 may include any suitable information relevant to constructing one or more hierarchies 275 and/or predicting the trustworthiness of a website. In some embodiments, the method 400 continues to step 420.

At step 420, hierarchical classifier tool 150 assigns the website to a first tier group in a hierarchy 275. In some embodiments the first tier group corresponds to a domain 254 that the website is associated with. If the hierarchy 275 does not already include a first tier group corresponding to the domain 254 to which the website is associated, hierarchical classifier tool 150 (e.g., construction engine 210) may be configured to create such group. Hierarchical classifier tool 150 may assign the website to a particular first tier group based on hierarchical information about the website. For example, hierarchical classifier tool 150 may determine that Website #1 252a is associated with Domain #1 254a based on website information 160 received in step 410. In some embodiments the method 400 may continue to step 430.

At step 430, hierarchical classifier tool 150 assigns the website to a second tier group in the hierarchy 275. In some embodiments the second tier group corresponds to an IP address 256 that the website is associated with. If the hierarchy 275 does not already include a second tier group corresponding to the IP address 256 that the website is associated with, hierarchical classifier tool 150 (e.g., construction engine 210) may be configured to create such group. Hierarchical classifier tool 150 may assign the website to a particular second tier group based on hierarchical information about the website. For example, hierarchical classifier tool 150 may assign Website #1 252a to a second tier group corresponding to IP Address #1 256a based on website information 160 received in step 410. In some embodiments the method 400 may continue to step 440.

At step 440, hierarchical classifier tool 150 assigns the website to a third tier group in the hierarchy 275. In some embodiments the third tier group corresponds to an autonomous system 258. If the hierarchy 275 does not already include a third tier group corresponding to the autonomous system 258 that the website is associated with, hierarchical classifier tool 150 (e.g., construction engine 210) may be configured to create such group. Hierarchical classifier tool 150 may assign the website to a particular third tier group based on hierarchical information about the website. For example, hierarchical classifier tool 150 may assign Website #1 252a to a third tier group corresponding to Autonomous System #1 258a based on website information 160 received in step 410. In some embodiments the method 400 continues to a decision step 450.

At decision step 450, hierarchical classifier tool 150 determines whether the assigned website is trustworthy. In some embodiments, this determination is made by evaluation engine 220. In some embodiments, determining whether the website is trustworthy is based on website information 160 received in step 410. For example, website information 160 may include thirty reports that Website #1 252a is malicious. In such an example, hierarchical classifier tool 150 may determine that Website #1 252a is not trustworthy. The determination regarding trustworthiness of a website may be made based on website information 160 related to the trustworthiness of the particular website. For example, hierarchical classifier tool 150 may use website ratings about the website, reports from users 120 about the maliciousness of the website, any publically available information about the website, and/or any other suitable information indicating the trustworthiness of their website to determine whether a website is trustworthy.

If hierarchical classifier tool 150 determines that the assigned website is trustworthy, the method 400 continues to step 460a. Alternatively, if hierarchical classifier tool 150 determines that the assigned website is not trustworthy, the method 400 continues to step 460b. In other embodiments, hierarchical classifier tool 150 may determine that trustworthiness of the website is unknown. In some embodiments, the trustworthiness determination of hierarchical classifier tool 150 is associated with a confidence (e.g., hierarchical classifier tool 150 is 85% confident that Website #1 252a is untrustworthy) and/or a threshold. In some embodiments, the method 400 continues to step 460.

At step 460, hierarchical classifier tool 150 classifies, or tags, the website based on the trustworthiness determination made in step 450. For example, if in step 450 the website was determined to be trustworthy, hierarchical classifier tool 150 will classify, or tag, the website as trustworthy 460a. As another example, if in step 450 the website was determined to be untrustworthy, hierarchical classifier tool 150 will classify, or tag, the website as not trustworthy 460b. In some other embodiments, hierarchical classifier tool 150 will classify, or tag, the website as having an unknown trustworthiness or as being indeterminable. In some embodiments, the method 400 concludes at step 465.

In another embodiment, information about a plurality of websites rather is received by hierarchical classifier tool 150. In such an embodiment, each website of the plurality of websites is be assigned to a group in each tier of the hierarchy and classified as described above in relation to steps 420-460. The method may repeat until every website included in the received information is assigned to groups of the hierarchy and classified.

The method 500 of FIG. 5 illustrates one embodiment of predicting the trustworthiness of a website using a hierarchical classifier such as the hierarchical classifier described above in reference to FIG. 4. This disclosure recognizes that the methods 400 and 500 may be performed in parallel.

The method 500 may begin in a step 505. At step 510, hierarchical classifier tool 150 receives information about a plurality of websites. In some embodiments, the received information is website information 160 as described above. In some embodiments, the received information is the same information received in step 410 of method 400. In some embodiments the method 500 continues to a step 520.

At step 520, hierarchical classifier tool 150 constructs a hierarchical classifier 250 based on information received in step 510. In some embodiments hierarchical classifier is constructed according to the steps of method 400 described above. Thus, in some embodiments, hierarchical classifier tool 150 may determine associations for each website of the plurality of websites for which it received website information 160 and assign the websites to one or more groups in hierarchy 275 based on the hierarchical associations (similar to steps 420, 430, and 440 of method 400). In some embodiments, the method 500 continues to step 530.

At step 530, hierarchical classifier tool 150 determines whether each website of the plurality of websites is trustworthy. In some embodiments, determining whether a website 252 is trustworthy is performed in a manner similar to that described above in relation to step 450 and 460 of method 400. Thus, in some embodiments, hierarchical classifier tool 150 determines whether each website of the plurality of websites is trustworthy based on website information 160 received in step 510. In some embodiments, the method 500 continues to step 540.

At step 540, hierarchical classifier tool 150 receives information about a particular website. In some embodiments, a particular website is an unknown website. As referred to herein, an unknown website refers to a website that has not yet been classified and/or assigned into one or more groups of a hierarchy 275. In other embodiments, the particular website may be a website that has been previously classified and/or assigned to one or more groups of a hierarchy 275. The information received about the particular website may include an identifier of the particular website such as the name and/or URL. The information received about the particular website may also include real-time data about the particular website such as information provided by domain identifiers (e.g., WHOIS, Neustar Ultratools) and/or by ratings software (e.g., Dynamic Real Time Rating® by Blue Coat Systems, Inc.). Such information may include hierarchical information including associations that the particular website has with a domain 254, an IP address 256, and an autonomous system 258. Further, the information about the particular website may include any observations (e.g., observations 310 of FIG. 3) about the particular website. In some embodiments, the method 500 may continue to step 550.

At step 550, hierarchical classifier tool 150 assigns the particular website to one or more groups in the hierarchy 275. In some embodiments, the particular website is assigned to at least one group in each tier (if more than one) of a hierarchy 275. Hierarchical classifier tool 150 may assign the particular website to particular groups in the hierarchy based on information received about the particular website in step 540. For example, hierarchical classifier tool 150 may assign the particular website to groups corresponding to Domain #4 254d, IP Address #2 256c, and Autonomous System #2 258c based on hierarchical information received in step 540 regarding associations of the particular website. In some other embodiments, instead of assigning the particular website to groups in a hierarchy 275, hierarchical classifier tool 150 identifies groups in the hierarchy to which the particular website would be assigned. The identification may be performed in a manner similar to determining which groups to assign the particular website to. In some embodiments, the method 500 may continue to a decision step 560.

At decision step 560, hierarchical classifier tool 150 determines whether the particular website is trustworthy. As described above, in some embodiments, prediction engine 240 makes the determination as to the trustworthiness of particular website. The prediction of prediction engine 240 may be associated with a confidence and/or a threshold. In some embodiments, determining whether the particular website is trustworthy is based on the information received about the plurality of websites in step 510 and/or information about one or more hierarchies 275 (e.g., determinations made regarding the trustworthiness of websites in step 530). In some embodiments, determining whether the particular website is trustworthy is based on real-time data associated with the particular website that was received in step 540. For example, if classifying engine 230 determines that the particular website is associated with Domain #4 254c, IP Address #2 256c, and Autonomous System #3 258c, it may assign the particular website to groups in hierarchy 275C. Based on the information about hierarchy 275C (including information about websites assigned to groups in hierarchy 275C), hierarchical classifier tool 150 may determine that the particular website is trustworthy. In some embodiments, after making a determination as to the trustworthiness of the particular website, the method 500 continues to a classification step 570.

At step 570, hierarchical classifier tool 150 classifies, or tags, the particular website based on the trustworthiness determination made in step 560. For example, if in step 560 the particular website was determined to be trustworthy, hierarchical classifier tool 150 will classify, or tag, the particular website as trustworthy 570a. As another example, if in step 560 the particular website was determined to be untrustworthy, hierarchical classifier tool 150 will classify, or tag, the particular website as not trustworthy 570b. In some other embodiments, hierarchical classifier 150 may determine that the trustworthiness of the particular website is unknown or indeterminable. In some embodiments, the method 500 concludes at step 575.

Figure 6:
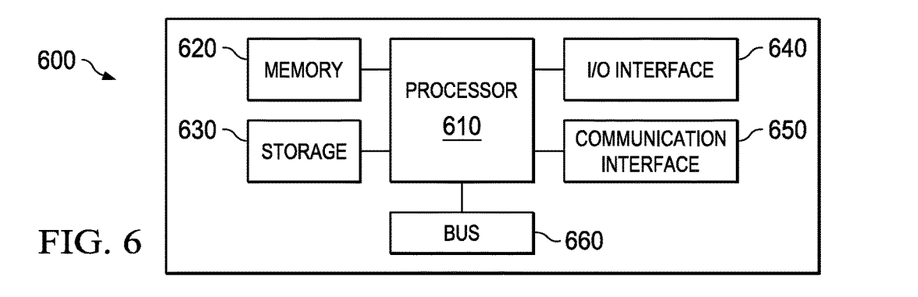
FIG. 6 is a block diagram illustrating an example computer system that may be used to implement the methods of FIGS. 4 and 5, according to certain embodiments.

FIG. 6 illustrates an example of a computer system 600. As described above, hierarchical classifier tool 150 may be a program that is implemented by a processor of a computer system such as computer system 600. Computer system 600 may be any suitable computing system in any suitable physical form. In some embodiments, computer system 600 may be device 125. As example and not by way of limitation, computer system 600 may be a virtual machine (VM), an embedded computer system, a system-on-chip (SOC), a single-board computer system (SBC) (e.g., a computer-on-module (COM) or system-on-module (SOM)), a desktop computer system, a laptop or notebook computer system, a mainframe, a mesh of computer systems, a server, an application server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

One or more computer systems 600 may perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As an example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

Computer system 600 may include a processor 610, memory 620, storage 630, an input/output (I/O) interface 640, a communication interface 650, and a bus 660 in some embodiments, such as depicted in FIG. 7. Although this disclosure describes and illustrates a particular computer system having a particular number of particular components in a particular arrangement, this disclosure contemplates any suitable computer system having any suitable number of any suitable components in any suitable arrangement.

Processor 610 includes hardware for executing instructions, such as those making up a computer program, in particular embodiments. For example, processor 610 may execute recommendation engine 150 to generate solutions. As an example and not by way of limitation, to execute instructions, processor 610 may retrieve (or fetch) the instructions from an internal register, an internal cache, memory 620, or storage 630; decode and execute them; and then write one or more results to an internal register, an internal cache, memory 620, or storage 630. In particular embodiments, processor 610 may include one or more internal caches for data, instructions, or addresses. This disclosure contemplates processor 610 including any suitable number of any suitable internal caches, where appropriate. As an example and not by way of limitation, processor 610 may include one or more instruction caches, one or more data caches, and one or more translation lookaside buffers (TLBs). Instructions in the instruction caches may be copies of instructions in memory 620 or storage 630, and the instruction caches may speed up retrieval of those instructions by processor 610. Data in the data caches may be copies of data in memory 620 or storage 630 for instructions executing at processor 610 to operate on; the results of previous instructions executed at processor 610 for access by subsequent instructions executing at processor 610 or for writing to memory 620 or storage 630; or other suitable data. The data caches may speed up read or write operations by processor 610. The TLBs may speed up virtual-address translation for processor 610. In particular embodiments, processor 610 may include one or more internal registers for data, instructions, or addresses. This disclosure contemplates processor 610 including any suitable number of any suitable internal registers, where appropriate. Where appropriate, processor 610 may include one or more arithmetic logic units (ALUs); be a multi-core processor; or include one or more processors 175. Although this disclosure describes and illustrates a particular processor, this disclosure contemplates any suitable processor.

Memory 620 may include main memory for storing instructions for processor 610 to execute or data for processor 610 to operate on. As an example and not by way of limitation, computer system 600 may load instructions from storage 630 or another source (such as, for example, another computer system 600) to memory 620. Processor 610 may then load the instructions from memory 620 to an internal register or internal cache. To execute the instructions, processor 610 may retrieve the instructions from the internal register or internal cache and decode them. During or after execution of the instructions, processor 610 may write one or more results (which may be intermediate or final results) to the internal register or internal cache. Processor 610 may then write one or more of those results to memory 620. In particular embodiments, processor 610 executes only instructions in one or more internal registers or internal caches or in memory 620 (as opposed to storage 630 or elsewhere) and operates only on data in one or more internal registers or internal caches or in memory 620 (as opposed to storage 630 or elsewhere). One or more memory buses (which may each include an address bus and a data bus) may couple processor 610 to memory 620. Bus 660 may include one or more memory buses, as described below. In particular embodiments, one or more memory management units (MMUs) reside between processor 610 and memory 620 and facilitate accesses to memory 620 requested by processor 610. In particular embodiments, memory 620 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 620 may include one or more memories 180, where appropriate. Although this disclosure describes and illustrates particular memory, this disclosure contemplates any suitable memory.

Storage 630 may include mass storage for data or instructions. As an example and not by way of limitation, storage 630 may include a hard disk drive (HDD), a floppy disk drive, flash memory, an optical disc, a magneto-optical disc, magnetic tape, or a Universal Serial Bus (USB) drive or a combination of two or more of these. Storage 630 may include removable or non-removable (or fixed) media, where appropriate. Storage 630 may be internal or external to computer system 600, where appropriate. In particular embodiments, storage 630 is non-volatile, solid-state memory. In particular embodiments, storage 630 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 630 taking any suitable physical form. Storage 630 may include one or more storage control units facilitating communication between processor 610 and storage 630, where appropriate. Where appropriate, storage 630 may include one or more storages 140. Although this disclosure describes and illustrates particular storage, this disclosure contemplates any suitable storage.

I/O interface 640 may include hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 185 for them. Where appropriate, I/O interface 640 may include one or more device or software drivers enabling processor 610 to drive one or more of these I/O devices. I/O interface 640 may include one or more I/O interfaces 185, where appropriate. Although this disclosure describes and illustrates a particular I/O interface, this disclosure contemplates any suitable I/O interface.

Communication interface 650 may include hardware, software, or both providing one or more interfaces for communication (such as, for example, packet-based communication) between computer system 600 and one or more other computer systems 600 or one or more networks (e.g., network 110). As an example and not by way of limitation, communication interface 650 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 650 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 650 for any of these networks, where appropriate. Communication interface 650 may include one or more communication interfaces 190, where appropriate. Although this disclosure describes and illustrates a particular communication interface, this disclosure contemplates any suitable communication interface.

Bus 660 may include hardware, software, or both coupling components of computer system 600 to each other. As an example and not by way of limitation, bus 660 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 660 may include one or more buses 212, where appropriate. Although this disclosure describes and illustrates a particular bus, this disclosure contemplates any suitable bus or interconnect.

The components of computer system 600 may be integrated or separated. In some embodiments, components of computer system 600 may each be housed within a single chassis. The operations of computer system 600 may be performed by more, fewer, or other components. Additionally, operations of computer system 600 may be performed using any suitable logic that may comprise software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the embodiments described or illustrated herein that a person having ordinary skill in the art would comprehend. The scope of this disclosure is not limited to the embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A hierarchical system for determining a trustworthiness of a website to prevent malware, the system comprising:
a processor configured to:
receive information about a plurality of websites, wherein at least one of the plurality of websites exhibits behavior associated with malware;
construct a hierarchical classifier by:
constructing a hierarchy of groups based on the information about the plurality of websites, the hierarchy of groups comprising:
one or more first tier groups corresponding to one or more domains, wherein one or more of the plurality of websites are associated with the one or more domains;
one or more second tier groups corresponding to one or more internet protocol addresses, wherein one or more of the domains are associated with the one or more internet protocol addresses; and
one or more third tier groups corresponding to one or more autonomous systems, wherein one or more of the internet protocol addresses are associated with the one or more autonomous systems;
determining whether a level of trustworthiness for each website of the plurality of websites satisfies a pre-determined threshold based on the information about the plurality of websites;
receiving information about a particular website;
predicting the trustworthiness of the particular website using the hierarchical classifier, wherein predicting the trustworthiness of the particular website comprises:
in response to receiving real-time data about the particular website, identifying at least a first tier group, a second tier group, and a third tier group of the hierarchy of groups to which the particular website should be assigned based on the real-time data about the particular website;
determining whether the particular website is trustworthy based on whether other websites assigned to the identified groups are trustworthy;
tagging the particular website as trustworthy, untrustworthy, or undetermined; and
preventing a user from visiting a website tagged as untrustworthy.

2. A hierarchical system for determining a trustworthiness of a website to prevent malware, the system comprising:
a processor configured to:
receive information about a plurality of websites, wherein at least one of the plurality of website exhibits behavior associated with malware;
construct a hierarchical classifier by:
constructing a hierarchy of groups based on the information about the plurality of websites, wherein:
the hierarchy of groups comprises one or more tiers, each tier comprising one or more groups; and
each website of the plurality of websites is assigned to at least one group in each tier;
determining whether a level of trustworthiness for each website of the plurality of websites satisfies a pre-determined threshold on the information about the plurality of websites;
tagging each website as trustworthy, untrustworthy, or undetermined; and
preventing a user from visiting a website tagged as untrustworthy.

3. The hierarchical system of claim 2, wherein the hierarchy of groups comprises:
one or more first tier groups corresponding to one or more domains, wherein one or more of the plurality of websites are associated with the one or more domains;
one or more second tier groups corresponding to one or more internet protocol addresses, wherein one or more of the domains are associated with the one or more internet protocol addresses; and
one or more third tier groups corresponding to one or more autonomous systems, wherein one or more of the internet protocol addresses are associated with the one or more autonomous systems.

4. The hierarchical system of claim 2, wherein the processor is further configured to:
receive information about a particular website; and predict the trustworthiness of the particular website using the hierarchical classifier.

5. The hierarchical system of claim 2, wherein predicting the trustworthiness of the particular website comprises:
receiving real-time data about the particular website;
identifying one or more groups of the hierarchy of groups to which the particular website should be assigned, wherein the one or more groups are identified based on the real-time data about the particular website; and
determining whether the particular website is trustworthy based on whether other websites assigned to the identified groups are trustworthy.

6. The hierarchical system of claim 2, wherein predicting the trustworthiness of the particular website comprises determining whether the prediction is based on the received information about the plurality of websites.

7. The hierarchical system of claim 2, wherein the processor is further configured to classify the particular website into the hierarchy of groups, wherein classifying the particular website comprises assigning the particular website to at least one group in each tier.

8. A method for determining a trustworthiness of a website to prevent malware comprising:
predicting the trustworthiness of a particular website using a hierarchical classifier, wherein predicting the trustworthiness of the particular website comprises:

receiving information about a particular website;

identifying one or more groups of a hierarchy of groups to which the particular website should be assigned, wherein the one or more groups are identified based on the received information about the particular website;

determining whether the particular website is trustworthy based on the trustworthiness of websites assigned to the same groups as the particular website;

determining whether the particular website is trustworthy based on whether other websites assigned to the identified groups are trustworthy and determining that the trustworthiness of other websites satisfies a predetermined trustworthiness threshold;

tagging the particular website as trustworthy, untrustworthy, or undetermined; and preventing a user from visiting a website tagged as untrustworthy.

9. The method of claim 8, wherein: the received information about the particular website comprises real-time data about the particular website; and the one or more groups are identified based on the real-time data about the particular website.

10. The method of claim 8, wherein predicting the trustworthiness of the particular website comprises determining whether the prediction is based on information about the plurality of websites.

11. The method of claim 8, further comprising classifying the particular website into the hierarchy of groups, wherein classifying the particular website comprises assigning the particular website to at least one group in each tier of the hierarchy of groups.

12. The method of claim 8, further comprising:
constructing the hierarchical classifier by:
receiving information about a plurality of websites;
constructing a hierarchy of groups from the received information, the hierarchy of groups comprising one or more tiers, each tier comprising one or more groups;
assigning each website of the plurality of websites to at least one group in each tier; and
determining whether each website of the plurality of websites is trustworthy based on the information about the plurality of websites.

13. The method of claim 12, wherein the hierarchy of groups comprises:
one or more first tier groups corresponding to one or more domains, wherein one or more of the plurality of websites are associated with the one or more domains;
one or more second tier groups corresponding to one or more internet protocol addresses, wherein one or more of the domains are associated with the one or more internet protocol addresses; and
one or more third tier groups corresponding to one or more autonomous systems, wherein one or more of the internet protocol addresses are associated with the one or more autonomous systems.

14. One or more computer-readable non-transitory storage media in one or more computing systems, the media embodying logic for determining a trustworthiness of a website to prevent malware that is operable when executed to:
receive information about a plurality of websites, wherein at least one of the plurality of website exhibits behavior associated with malware;
construct a hierarchical classifier by:
constructing a hierarchy of groups based on the information about the plurality of websites, wherein:
the hierarchy of groups comprises one or more tiers, each tier comprising one or more groups; and
each website of the plurality of websites is assigned to at least one group in each tier;
determining whether a level of trustworthiness for each website of the plurality of websites satisfies a predetermined threshold on the information about the plurality of websites;
tagging each website as trustworthy, untrustworthy, or undetermined; and
preventing a user from visiting a website tagged as untrustworthy.

15. The media of claim 14, wherein the logic is further operable to update the information about the plurality of websites with one or more of:
information about the particular website; and
the trustworthiness prediction regarding the particular website.

16. The media of claim 14, wherein the hierarchy of groups comprises:
one or more first tier groups corresponding to one or more domains, wherein one or more of the plurality of websites are associated with the one or more domains;
one or more second tier groups corresponding to one or more internet protocol addresses, wherein one or more of the domains are associated with the one or more internet protocol addresses; and
one or more third tier groups corresponding to one or more autonomous systems, wherein one or more of the internet protocol addresses are associated with the one or more autonomous systems.

17. The media of claim 14, wherein predicting whether the particular website is trustworthy comprises:
receiving real-time data about the particular website;
identifying one or more groups of the hierarchy of groups to which the particular website should be assigned, wherein the one or more groups are identified based on the real-time data about the particular website; and
determine whether the particular website is trustworthy based on the trustworthiness of other websites assigned to the same groups as the particular website.

18. The media of claim 14, wherein predicting the trustworthiness of the particular website comprises determining whether the prediction is based on the received information about the plurality of websites.

* * * * *